June 3, 1952    R. C. BISSELL    2,599,043
WEIGHT-SHIFTING DEVICE FOR DUAL AXLE VEHICLES
Filed Oct. 26, 1950    3 Sheets-Sheet 1

INVENTOR.
RAYMOND C. BISSELL
BY
ATTORNEY

June 3, 1952            R. C. BISSELL            2,599,043
WEIGHT-SHIFTING DEVICE FOR DUAL AXLE VEHICLES
Filed Oct. 26, 1950            3 Sheets-Sheet 2
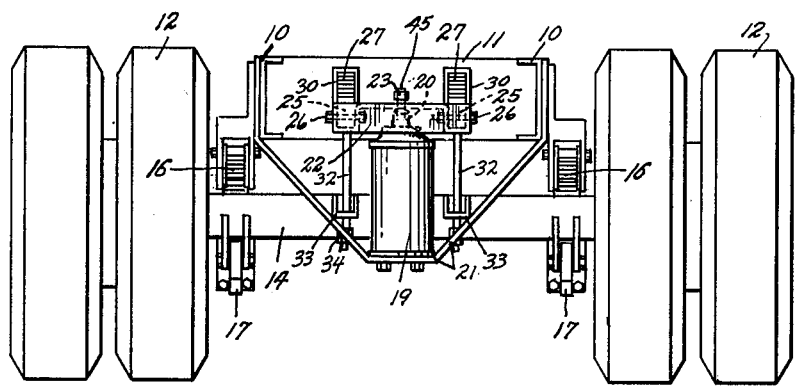
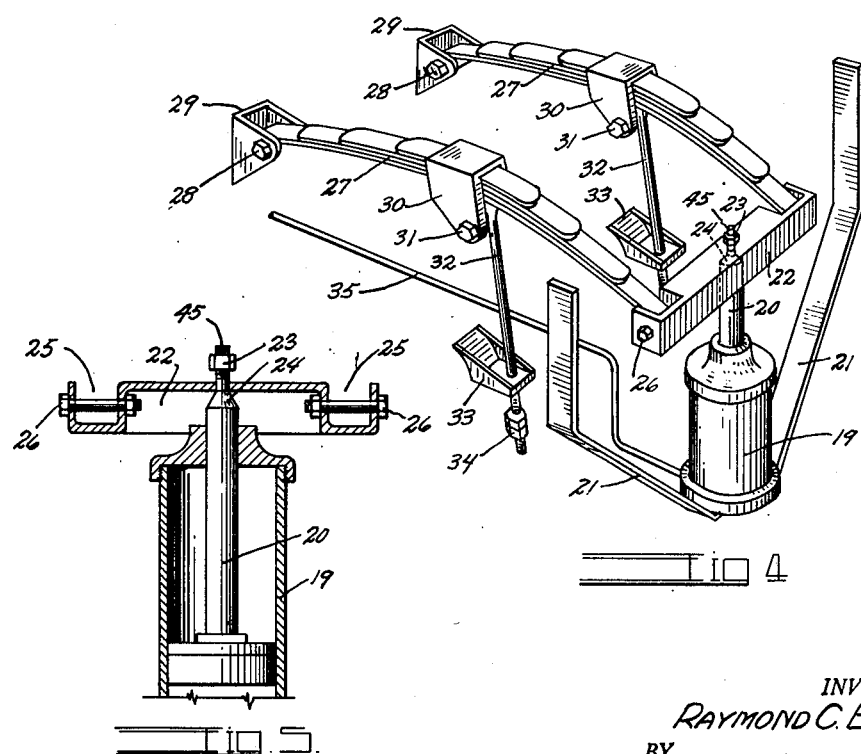
INVENTOR.
RAYMOND C. BISSELL
BY
ATTORNEY June 3, 1952  R. C. BISSELL  2,599,043
WEIGHT-SHIFTING DEVICE FOR DUAL AXLE VEHICLES
Filed Oct. 26, 1950  3 Sheets-Sheet 3
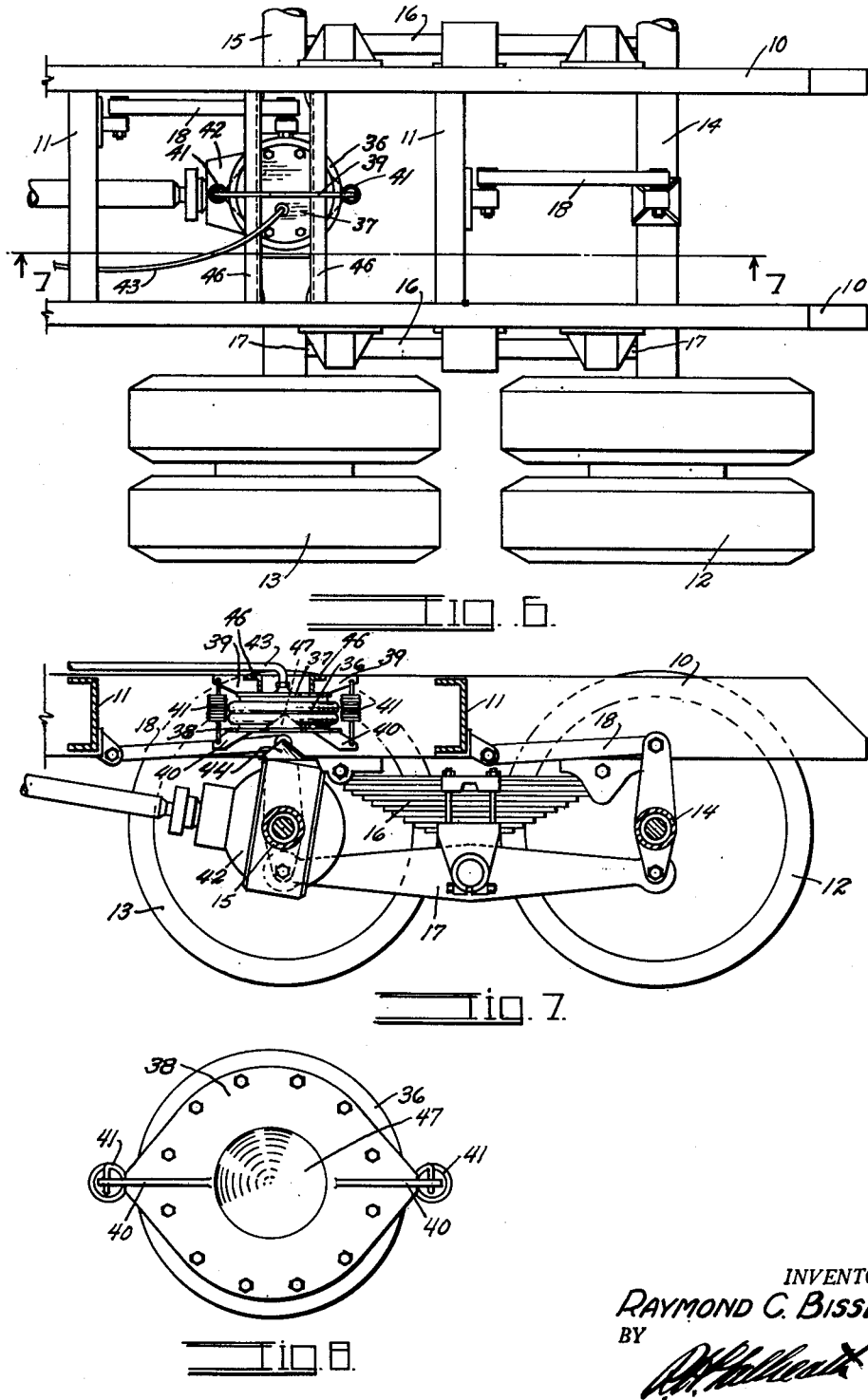
INVENTOR.
RAYMOND C. BISSELL
BY
ATTORNEY Patented June 3, 1952

2,599,043

UNITED STATES PATENT OFFICE 2,599,043

WEIGHT-SHIFTING DEVICE FOR DUAL AXLE VEHICLES

Raymond C. Bissell, Denver, Colo., assignor to Timpte Bros., Inc., Denver, Colo., a corporation of Colorado Application October 26, 1950, Serial No. 192,225

2 Claims. (Cl. 180—22)

1

This invention relates to a load-shifting device for automotive vehicles of the multi-wheel type. Trucks and busses provided with two rear axles, one of which is a driving axle, occasionally encounter traction difficulties due to the fact that the load is so uniformly distributed over the wheels of both axles that there is not sufficient weight on the driving axle to obtain driving traction on slippery roads.

The principal object of this invention is to provide means whereby the driver may quickly and easily shift any desired portion of the load from the idler wheels to the driving wheels to obtain greater traction on the latter under slippery road conditions.

Another object of the invention is to provide a simple, complete, compact unit which can be quickly and easily applied to any of the conventional multi-wheel, balanced-load axles, without requiring changes in, or rebuilding of, the latter and without interfering with the normal operation of the balanced axles.

A further object is to provide a load-shifting mechanism which will operate resiliently when the load is shifted so as to avoid any rigid suspension constructions which might result in damage to the wheels, tires, and wheel-supporting mechanism.

Other objects and advantages reside in the detail construction of the invention, which is designed for simplicity, economy, and efficiency. These will become more apparent from the following description.

In the following detailed description of the invention, reference is had to the accompanying drawing which forms a part thereof. Like numerals refer to like parts in all views of the drawing and throughout the description.

In the drawing:

Fig. 3 is a rear view thereof;

Fig. 4 is a perspective view of the complete load-shifting attachment;

Fig. 5 is an enlarged, fragmentary, detail section, taken on the line 5—5, Fig. 1;

Fig. 6 is a plan view of the wheel mounting with an alternate form of weight-shifting device applied thereto;

Fig. 7 is a longtitudinal section, taken on the line 7—7, Fig. 6, showing the alternate form of weight-shifting device; and

2

Figure 1:
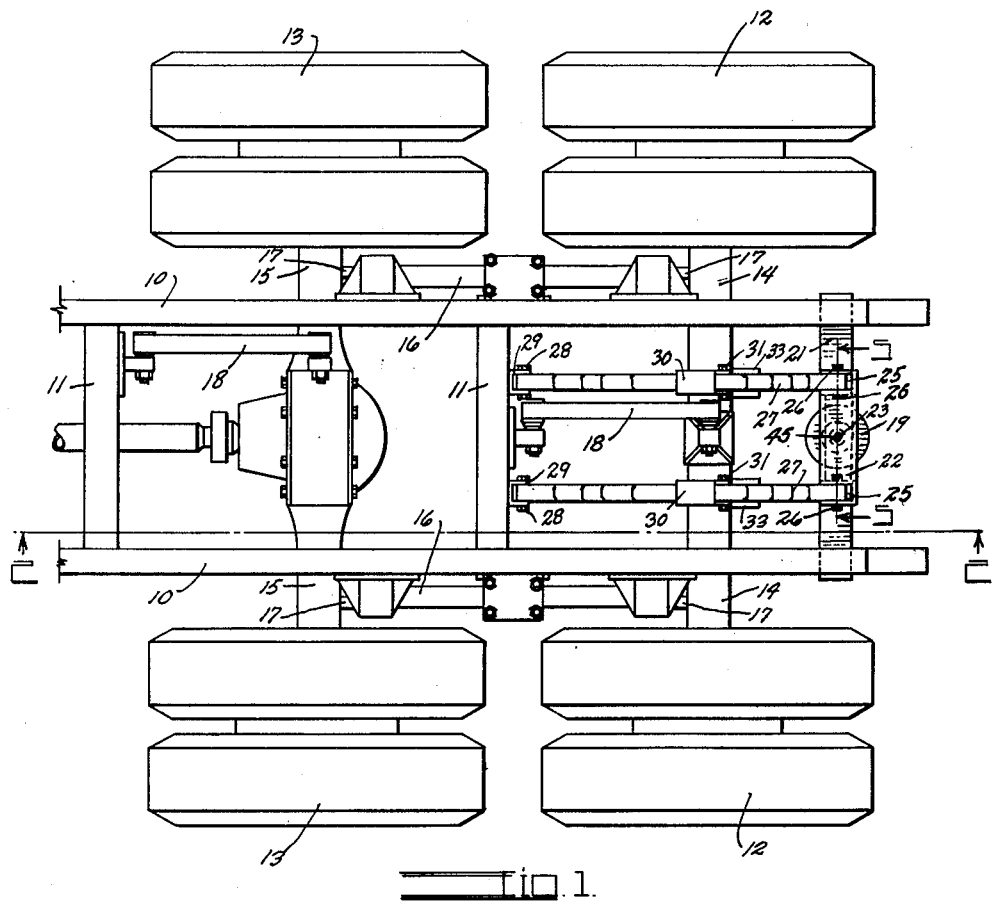
Fig. 1 is a plan view of a conventional balanced wheel mounting as used on large trucks and the like, illustrating the invention applied thereto.

Fig. 8 is a fragmentary, detail, bottom view of the device of Fig. 6.

In the drawing, parts of a conventional balanced-wheel vehicle are designated by numeral as follows: longitudinal chassis members 10, cross chassis members 11, idler wheels 12, driving wheels 13, idler axle housing 14, driving axle housing 15, chassis spring 16, load-balancing beams 17, torque rods 18, and differential housing 42.

In the conventional vehicle the balancing beams 17 act to distribute the load between the axle housings 14 and 15, and act to cause either axle to move upwardly as the other axle moves downwardly. The improved weight-shifting device takes advantage of this cooperating action of the balancing beams 17. The first form of the invention acts to lift the rear axle housing 14, when desired, so as to transfer a portion of the load normally carried by the wheels 12 to the driving wheels 13 so as to increase the tractive effort of the latter.

The first form of the improved weight-shifting device comprises a pressure cylinder 19 arranged to force a plunger 20 upwardly, and supplied with air or fluid under pressure through a suitable conduit 35 from the compressed air brake reservoir of the vehicle or from a hydraulic pressure source on the vehicle. The pressure cylinder is supported in a U-shaped saddle bar 21 which is welded or otherwise secured at its extremities to the two longitudinal chassis members 10. The upper extremity of the plunger 20 is reduced in diameter to form a supporting shoulder 24 and a mounting stud 45. The stud 45 extends through a cross head member 22 and carries a retaining nut 23 threaded thereon. The shoulder 24 is preferably tapered so that the cross head member 22 resting thereon is free to tilt in any direction on the plunger 20.

The extremities of the cross head member 22 are provided with spring-receiving recesses 25 through which suitable spring bolts 26 extend. The spring bolts serve to attach the rear extremities of two bowed leaf springs 27 to the member 22. The forward extremities of the springs 27 are mounted on a second pair of spring bolts 28 extending through the sides of U-shaped bracket members 29 adapted to be welded or otherwise secured to one of the cross chassis members 11.

A shackle member 30 is mounted on each of the springs 27 at substantially the middle of the latter. Each of the shackle members 30 supports a shackle bolt 31 from which a tension link 32 depends. The tension links slidably extend through shelf members 33, which are adapted to be welded or otherwise secured to the rear axle housing 14, and terminate in adjustable lifting nuts 34.

In applying the described form of the device to the vehicle, the U-shaped saddle bar 21 is welded or otherwise secured to the chassis members 10 rearwardly of the idler axle housing 14. The bracket members 29 are secured to the rear face of one of the chassis cross members 11 forwardly of the housing 14. The shelf members 33 are mounted on the idler axle housing 14 below the springs 27, and the conduit 35 is connected to the compressed air brake reservoir of the vehicle, or other source of pressure, through any suitable control valve (not shown).

Figure 2:
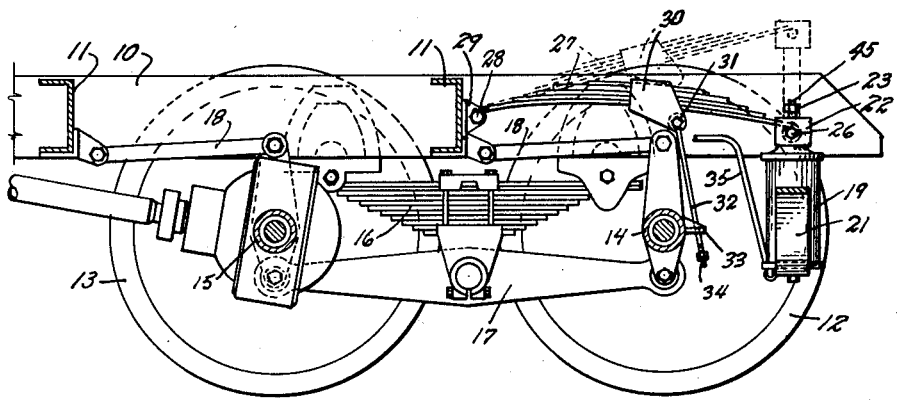
Fig. 2 is a longitudinal section, taken on the line 2—2, Fig. 1.

Normally the cross head member 22 rests directly on the hydraulic cylinder 19, as shown in Fig. 2, and the lifting nuts 34 are positioned sufficiently below the shelf members 33 so as not to interfere with the normal spring action, as shown in the latter figure. When in this position the device has no effect upon the normal wheel suspension or spring action of the vehicle.

Now let us assume that additional weight is desired on the driving wheels 13 for increased traction purposes. It is only necessary for the driver to admit hydraulic fluid to the cylinder 19. This forces the spring bar 22 upwardly until the nuts 34 are brought into contact with the shelf members 33. Additional upward movement of the spring bar acts to flex the springs 27 so that the rear idler axle housing 14 is pulled upwardly to relieve a portion of the weight on the wheels 12 and transfer it through the tilting beams 17 to the drive wheels 13.

While the action has been described as pulling the housing 14 upwardly, it might also be described as prying the chassis downwardly through the action of the springs 27 on the bracket members 29.

In Figs. 6, 7, and 8 a second form of the invention is illustrated for accomplishing the same purpose. In the alternate form an expansion bellows 36 is employed. Such a bellows is purchasable upon the open market and is generally used for operating air brakes on vehicles. The construction of the bellows, per se, forms no part of the present invention. The bellows is bolted between a flat top plate 37 and a bottom plate 38. The bottom plate 38 has a central, upwardly indented, conical depression 47. The top plate is welded or otherwise secured to a spring bar 39 which extends across the top of the plate 37 and projects outwardly forward and rearwardly thereof. Two angle bars 46 extend sidewardly from the spring bar 39 and project outwardly beyond both sides of the bellows 36. The angle bars are welded to the top plate 37 and to the spring bar 39 to form a rigid supporting frame.

The dished bottom plate 38 is provided with outwardly extending ears 40 which are positioned below the extremities of the spring bar 39. A tension spring 41 extends between each extremity of the spring bar 39 and one of the ears 40 to constantly urge the bellows to the closed position.

In applying the second form of the invention to a conventional dual-wheel mounting, the angle bars 46 are welded or otherwise secured between the longitudinal chassis members 10 over the differential housing 42 of the vehicle, and the bellows are connected by means of a supply pipe 43 with the compressed air or hydraulic system of the vehicle through a suitable control valve. A conical bumper cap member 44 is mounted on the differential housing 42 directly below the conical depression 47 in the bottom plate 38.

Normally the bottom plate 38 is well above the differential housing 42 and does not interfere in any way with the normal springing movements of the latter. However, should it be desired to transfer greater weight to the drive wheels 13, air or liquid under pressure is admitted to the bellows 36 to force the bottom plate 38 downwardly until the depression 47 therein receives and rides on the conical cap member 44 mounted on the housing 42. This acts to place additional body weight directly on the drive axle housing 15 for increased traction purposes and to relieve the weight upon the idler wheels 12.

It will be noted that the incline of the sides of the cap member 44 is steeper than the incline of the sides of the depression 47. Therefore, the weight rests upon the point of the cap member so that the chassis is free to tilt in all directions thereon.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. In a vehicle of the type having a driving axle and a non-driving axle positioned parallel to each other, means for transferring weight from the non-driving axle to the driving axle to increase the tractive effort of the latter when desired, comprising: tilting load beams extending between said axles; means for placing the weight of a vehicle on said beams intermediate their extremities; a fluid expanding device positioned over the driving axle; means for expanding said device downwardly into contact with said driving axle to transmit a portion of the load of said vehicle thereto, said tilting beams acting to relieve said non-driving axle of that portion of the load; and a conical cap member mounted on said driving axle and positioned to receive the downward thrust of said fluid-expanding device.

2. A wheel suspension for vehicles as described in claim 1 having a bottom plate mounted on said expanding device; and a conical depression formed in said plate to receive said conical cap when said expanding device is expanded.

RAYMOND C. BISSELL.

REFERENCES CITED

The following references are of record in the file of this patent:

UNITED STATES PATENTS

| Number | Name | Date |
| --- | --- | --- |
| 1,857,249 | Marcum | May 10, 1932 |

FOREIGN PATENTS

| Number | Country | Date |
| --- | --- | --- |
| 432,422 | Great Britain | July 25, 1935 |